United States Patent [19]

Young et al.

[11] Patent Number: 4,506,295
[45] Date of Patent: Mar. 19, 1985

[54] PROJECTION TELEVISION RECEIVER WITH UNITARY OPTICS FRAME

[75] Inventors: James R. Young; Bertram VanBreemen, both of Indianapolis, Ind.

[73] Assignee: RCA Corporation, New York, N.Y.

[21] Appl. No.: 403,457

[22] Filed: Jul. 30, 1982

[51] Int. Cl.³ .............................................. H04N 9/31
[52] U.S. Cl. .................... 358/60; 358/231; 358/254; 350/123; 312/257 SK
[58] Field of Search .......... 358/60, 229, 231, 237–239, 358/64, 254; 312/257 SK; D14/79, 82, 83, 77; 350/123; 355/44, 45

[56] References Cited

U.S. PATENT DOCUMENTS

| | | | |
|---|---|---|---|
| 1,589,493 | 6/1926 | Victor | 350/123 |
| 3,909,523 | 9/1975 | Bartucci | 358/60 |
| 4,177,484 | 12/1979 | Boje | 358/254 |
| 4,297,723 | 10/1981 | Whitby | 358/60 |
| 4,400,723 | 8/1983 | Fanizza | 358/60 |

*Primary Examiner*—Tommy P. Chin
*Attorney, Agent, or Firm*—Paul J. Rasmussen; Peter M. Emanuel; Scott J. Stevens

[57] ABSTRACT

A mounting frame for optical components of a projection television receiver comprises tubular members interconnected to form a skeletal structure. The mounting frame incorporates sub-frames to which the projection tubes, mirror assemblies and screen are mounted. The frame forms a rigid structure which maintains the positional relationship between the optical components in spite of environmental or other changes, thereby facilitating assembly and adjustment of the projection television receiver.

9 Claims, 3 Drawing Figures

PROJECTION TELEVISION RECEIVER WITH UNITARY OPTICS FRAME

This invention relates to mounting and adjustment of optical components in a rear projection television receiver.

Large screen projection television receivers are available in front or rear projection styles. Front projection receivers cause light emanating from one or more projection cathode ray tubes to impinge upon the front of a reflective screen, thereby creating a magnified viewable image. Front projection receivers may be constructed in one or two pieces, with the one-piece unit commonly having a fold-out drawer containing a mirror and the two-piece unit having a stand-alone screen separated from the tube and electronic components by a predetermined distance.

Rear projection receivers cause light from the projection tubes to fall upon the back of a translucent screen, thereby creating a viewable image on the front of the screen. Rear projection units incorporate all the electronic and optical components within a single cabinet, resulting in a more compact, less obtrusive structure.

With either type of projection receiver, the large size of the final image requires precise alignment of the optical components in order to produce a distortion free image. In receivers incorporating three projection tubes, stable registration and convergence of the superimposed rasters is impossible to achieve if the positional relationship between the tubes, optical components and screen is not carefully controlled.

Control of the receiver component relative positions is difficult. Front projection units, because of their foldable or two-piece construction, are particularly prone to misadjustment and misalignment of parts. Rear projection receivers, even though housed in a single cabinet, are also subject to component misalignment. The individual optical parts are normally attached to the cabinet via mounting members. However, the cabinet, usually made of wood, is subject to dimensional changes due to environmental variations, such as humidity and temperature, and age, causing changes in the relative positions of the projection tubes, mirrors and screen, which may result in a decline in picture quality. If this occurs, the viewer must either accept the degraded picture or arrange for periodic service adjustments to be made.

The present invention is directed to a rear projection television receiver having a frame structure upon which the optical components of the receiver are mounted. Means are provided which allow fine adjustment of these components. The frame facilitates easy assembly and servicing of the receiver and maintains a relative positional relationship between the components regardless of environmental or other factors.

In accordance with the invention, a rear projection television receiver includes a skeletal unitary frame. Three projection tubes with associated lens elements are mounted to the frame. A first mirror for reflecting light produced by the projection tubes is mounted to the skeletal frame. A second mirror for reflecting light from the first mirror is mounted to the frame. In one embodiment, a projection screen for receiving light from the second mirror at the rear of the screen is also mounted to the frame. The skeletal frame therefore maintains the relative positions between the tubes, mirrors and screen.

In the accompanying drawing.

Figure 1:
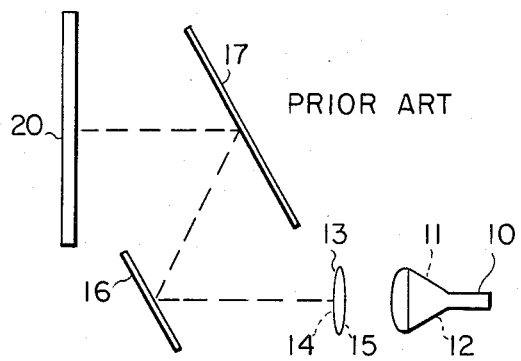
FIG. 1 is a diagrammatic representation of one form of a rear projection television receiver.

A rear projection television receiver, such as that shown diagrammatically in FIG. 1, comprises a plurality (typically three) of horizontally aligned projection cathode ray tubes 10, 11 and 12. Only tube 10 is visible in FIG. 1. In FIG. 1 tubes 10, 11 and 12 are monochrome tubes which produce red, green and blue images, respectively. Lens systems 13, 14 and 15 are respectively associated with projection tubes 10, 11 and 12. Each of lens systems 13, 14 and 15, of which only lens system 13 is shown in FIG. 1, may be mounted to the face or screen of its associated projection tube and may provide a straight or angled light path depending on the desired orientation of the tubes to the other optical components in the receiver. For example, it may be possible to make the projection receiver more compact by using a lens system which imparts a right angle bend to the light paths exiting from the projection tubes. The magnified image is reflected off a first mirror 16 and a second mirror 17 where it impinges upon the back of a rear projection screen 20. Projection screen 20 may comprise several layers of screen material including a Fresnel lens for collimating the light and a lenticular lens layer for defining the viewing audience envelope and increasing the light gain of the screen. The monochrome rasters scanned by each of the projection tubes 10, 11 and 12 are superimposed to form a single color image on the screen. Even a relatively small misadjustment of the projection tubes, mirrors or screen can result in a large color misregister or misconvergence of the final magnified image.

Projection television receiver cabinets are typically made of wood with the optical components mounted to the cabinet either directly or indirectly through mounting structures in order to provide rigidity to the assembly. The wooden cabinet and mounting structures, however, are subject to dimensional and shape variations due to changes in humidity and temperature, and aging of the wood assembly. The relative positions of the optical components will also change since they are mounted to the cabinet. These positional changes may introduce register and convergence errors that require adjustment. Under certain conditions, this adjustment may be required frequently, thereby undesirably increasing the maintenance cost of the receiver.

Figure 2:
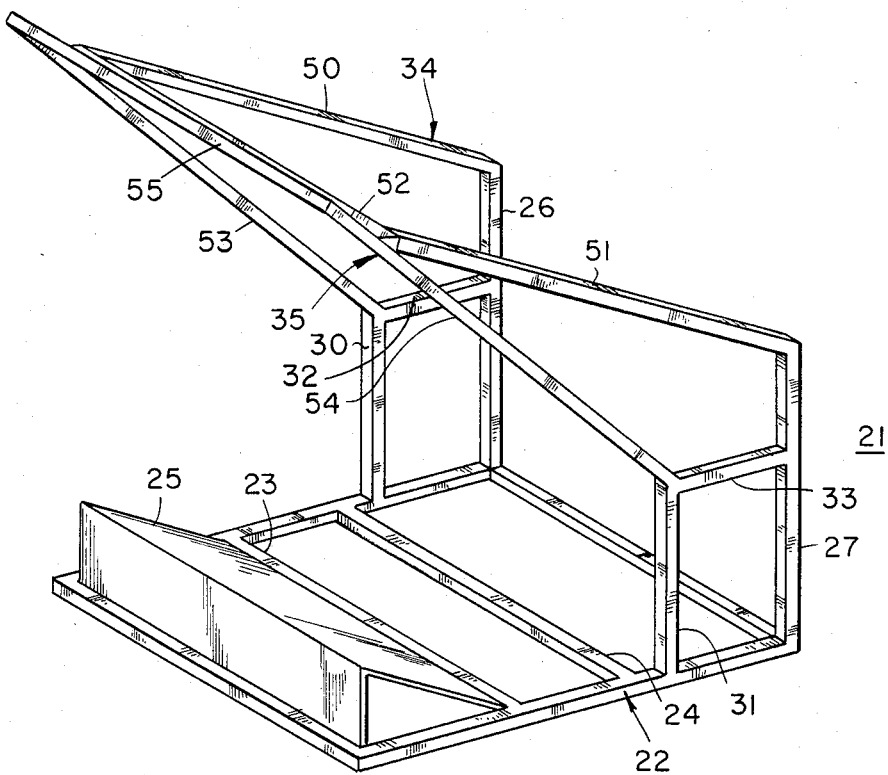
FIG. 2 is a perspective view of a rear projection television receiver component mounting frame in accordance with the present invention.

In accordance with the present invention, FIG. 2 shows a skeletal optics mounting frame 21 for use in a projection television receiver. The optical components of the receiver are mounted on optics frame 21 in a manner and location to be described later and frame 21 is mounted within a cabinet structure (not shown). Frame 21 may be of tubular metal construction, as shown in FIG. 2, which results in a skeletal structure having a great deal of strength and resistance to distortion.

Frame 21 comprises a rectangular base 22 incorporating cross bracing members 23 and 24. An angled platform 25 is disposed near one end of base 22. Upright members 26 and 27 extend from the corners of base 22 remote from platform 25 and upright members 30 and 31 extend from the intersection of base 22 and cross brace 24. Brace members 32 and 33 connect upright members 26 and 30, and upright members 27 and 31, respectively. A three-sided, angled sub-frame structure 34, having sides 50 and 51 and an end member 52, extends between upright members 26 and 27. A similar three-sided sub-frame structure 35, having sides 53 and 54 and an end member 55, extends between upright members 30 and 31. End member 52 of sub-frame structure 34 is fixed to sides 53 and 54 of sub-frame structure 35 near end member 55. In this manner, sub-frame structures 34 and 35 are joined together to form two closed loop structures.

Figure 3:
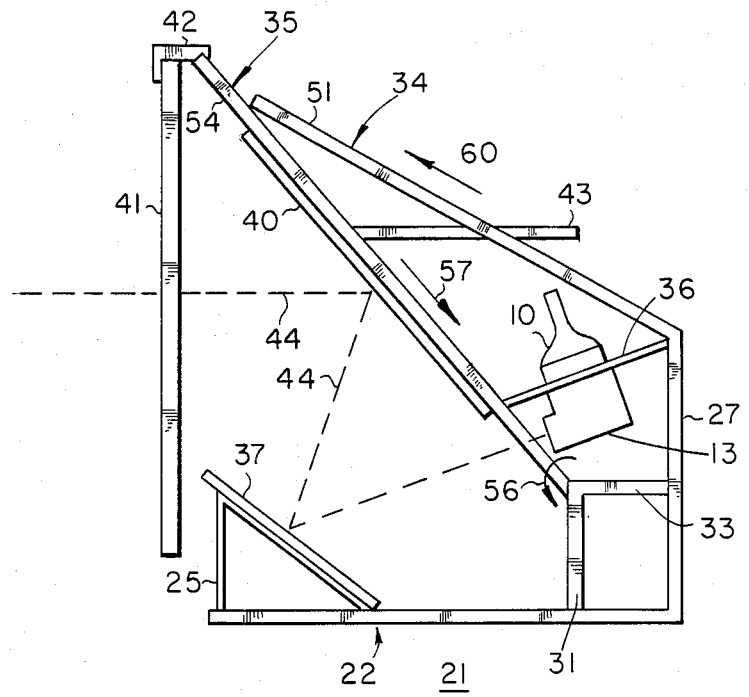
FIG. 3 is a side elevational view of the frame shown in FIG. 1 with the projection television components mounted thereon.

Referring to FIGS. 2 and 3, the positioning and mounting of the optical components on frame 21 will now be described.

Projection tubes 10, 11 and 12 are mounted on a metal mounting panel 36 which is then attached to frame 21 between upright members 26 and 27 and frame structure 35. Lens elements 13, 14 and 15 each impart a 90° bend to the light emanating from the tube display surface. A first reflecting mirror 37 is mounted on angled platform 25 which is angled to reflect light received from lens elements 13, 14 and 15 to a second reflecting mirror 40. Second reflecting mirror 40, larger than mirror 37, is mounted to frame structure 35 via a bridge structure (not shown) which allows the mirror to be supported at four points, yet be attached to frame 21 at three points in order to reduce mirror distortion or stresses due to vibration or frame movement. A rear projection screen 41 is shown mounted to end 55 of frame structure 35 via a bracket 42 so that screen 41 is suspended by its top edge. Alternately, screen 41 may be mounted directly to member 55 through the use of screws, for example. The receiver electrical chassis components 43 may also be mounted to frame 21, as shown in FIG. 3, to provide a more complete receiver assembly.

The particular positioning of mirrors 37 and 40 and the use of light angling lens elements 13, 14 and 15 allows for a primary light path, designated 44, that permits the screen 41 to be placed close to the ground. This results in a smaller compact cabinet which may be aesthetically more pleasing in the home.

Prior art component positioning and mounting techniques required extensive adjustment of the receiver during installation. The optics frame structure of the present invention allows preassembly and adjustment of most components at the factory, rather than at installation. The tubular metal used in frame 21, having expansion and contraction coefficients significantly less than that of wood or plastic, is not susceptible to changes in environment.

The construction and mounting and attachment locations of sub-frame structures 34 and 35 resists bending and distortion of frame 21. The bending moment (illustrated by arrow 56 in FIG. 3) exerted at the point of attachment of sides 53 and 54 with upright members 30 and 31 due to the weight of mirror 40 and screen 41 mounted on sub-frame structure 35 is translated into compression forces on sides 53 and 54 (shown by arrow 57) and tension forces on sides 50 and 51 (shown by arrow 60) of sub-frame structure 34. The tubular construction of frame 21 is highly resistant to tension and compression forces, thereby forming an extremely strong structure. The addition of sub-frame structure 34 therefore relieves the bending stresses on sub-frame structure 35. The structural construction techniques described with respect to a tubular frame would also be appropriate in the construction of a frame of sheet metal and would relieve bending stresses also.

The attachment of the projection screen to the optics frame further reduces changes in optical component positions and permits easy access and removal of the screen and other receiver components. Attachment of the screen to the frame also permits operating the receiver outside the cabinet, thereby facilitating servicing and factory adjustment. If desired, the screen may be mounted to the cabinet with the frame 21 mounted close to the screen. The positional changes will therefore be slight since the distance between screen and frame is small. The use of the optics frame 21 also permits servicing or replacement of receiver subassemblies and optical components without requiring time consuming adjustments. As previously described, the support of screen 41 from its top edge, rather than from the bottom as was done in prior art receiver, thereby reduces screen distortion caused by screen sag. Top support also improves screen flatness retention.

The skeletal optics frame 21 therefore simplifies the assembly and installation of the projection television receiver while eliminating the need for periodic optical adjustment. The design and construction of frame 21 maintains precise positional relationships between the optical components that are not significantly affected by changes in temperature, humidity or aging of the receiver.

What is claimed is:

1. A projection television system, comprising:
    a skeletal frame, incorporating a plurality of rigid members forming a plurality of integrated sub-frames;
    a plurality of projection television tubes mounted on said frame, for producing lighted images;
    a mirror assembly mounted on said frame, for receiving light from said tubes and directing said light at a predetermined angle with respect to said mirror assembly; and
    a projection screen, mounted for receiving light from said mirror assembly such that a viewable image is formed on the front of said screen,
    whereby the relative position of said projection tubes, said mirror assembly and said screen are fixed by said frame,
    wherein said mirror assembly comprises first and second mirrors, said first mirror receiving light from said projection tubes and said second mirror receiving light from said first mirror and directing said light to said screen, said second mirror being located between said screen and said projection tubes.

2. The arrangement defined in claim 1, wherein said screen receives light on the rear surface of said screen for forming an image on the front surface of said screen.

3. The arrangement defined in claim 1, wherein said screen is mounted to said unitary frame.

4. The arrangement defined in claim 3, wherein said screen is supported along its top by said unitary frame.

5. The arrangement defined in claim 1, wherein said rigid members have a tubular cross section.

6. The arrangement defined in claim 1, wherein said rigid members are metal.

7. A mounting frame for optical components of a projection television receiver comprising:
    a base assembly;
    a first sub-frame mounted to said base assembly and extending at an angle therefrom, said first sub-frame receiving optical components mounted thereon;

a second sub-frame mounted to said base assembly at a different location than said first sub-frame, said second sub-frame joined to said first sub-frame near the end of said first and second sub-frames remote from said base assembly, such that the weight of said optical components exerts compression forces on said first sub-frame and tension forces on said second sub-frame, whereby interaction of said first and second sub-frames substantially reduces bending of said first sub-frame caused by said optical components being mounted thereon.

8. The arrangement defined in claim 7, wherein the side of said first and second sub-frames form a quadrangle shape with respect to said base assembly.

9. The arrangement defined in claim 7, wherein said first and second sub-frames each comprise a plurality of rigid tubular metal members.

* * * * *